United States Patent
Larson et al.

(10) Patent No.: US 6,662,293 B1
(45) Date of Patent: Dec. 9, 2003

(54) INSTRUCTION DEPENDENCY SCOREBOARD WITH A HIERARCHICAL STRUCTURE

(75) Inventors: Richard H. Larson, Los Gatos, CA (US); Sanjay Patel, Fremont, CA (US); Poonacha P. Kongetira, Palo Alto, CA (US); Daniel L. Leibholz, Cambridge, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/577,219

(22) Filed: May 23, 2000

(51) Int. Cl.[7] .......................... G06F 15/00; G06F 9/80; G06F 9/40

(52) U.S. Cl. ...................................... 712/216; 712/217

(58) Field of Search .................................. 712/216, 217

(56) References Cited

U.S. PATENT DOCUMENTS

| | | | | |
|---|---|---|---|---|
| 5,627,983 A | * | 5/1997 | Popescu et al. | 712/217 |
| 5,640,588 A | | 6/1997 | Vegesna et al. | 395/800 |
| 5,664,193 A | | 9/1997 | Tirumalai | 395/705 |
| 5,710,902 A | | 1/1998 | Sheaffer et al. | 395/392 |
| 5,790,822 A | | 8/1998 | Shaeffer et al. | 395/380 |
| 5,835,747 A | | 11/1998 | Trull | 395/392 |
| 5,898,853 A | * | 4/1999 | Panwar et al. | 712/216 |
| 5,983,342 A | | 11/1999 | Tran | 712/218 |
| 6,167,508 A | * | 12/2000 | Farrell et al. | 712/217 |
| 6,351,802 B1 | * | 2/2002 | Sheaffer | 712/215 |

FOREIGN PATENT DOCUMENTS

EP    0 730 224 A2    4/1996

OTHER PUBLICATIONS

Heuring, Vincent P. and Jordan, Harry F. Computer Systems Design and Architecture. Reading, Mass.: Addison–Wesley Longman, Inc. ©1997. pp. 344–349.*

* cited by examiner

Primary Examiner—Eddie Chan
Assistant Examiner—Aimee J. Li
(74) Attorney, Agent, or Firm—Park, Vaughan & Fleming, LLp

(57) ABSTRACT

One embodiment of the present invention provides a system that selects instructions to be executed in a computer system that supports out-of-order execution of program instructions. The system receives dependency information for a first instruction. This dependency information identifies preceding instructions in the execution stream of a program that need to complete before the first instruction can be executed. The system divides this dependency information into a recent set and a less recent set. The recent set includes dependency information for a block of instructions immediately preceding the first instruction that need to complete before the first instruction can be executed. The less recent set includes dependency information for instructions not in the block of instructions immediately preceding the first instruction that need to complete before the first instruction can be executed. The system stores the recent set of dependency information in a first store, and stores the less recent set of dependency information in a second store. The first store is smaller and faster than the second store so that an update to dependency information takes less time to propagate through the first store than the second store. In one embodiment of the present invention, the system receives the dependency information for the first instruction from the first store and the second store, and determines from the dependency information if the first instruction is available to be executed by determining whether all preceding dependencies related to the first instruction have been satisfied. In one embodiment of the present invention, the system selects a second instruction from instructions that are available to be executed, and executes the second instruction.

20 Claims, 5 Drawing Sheets

INSTRUCTION DEPENDENCY SCOREBOARD WITH A HIERARCHICAL STRUCTURE

BACKGROUND

1. Field of the Invention

The present invention relates to computer system processor architectures that support out-of-order execution. More specifically, the present invention relates to an instruction dependency scoreboard unit including a smaller faster portion and a larger slower portion.

2. Related Art

Modern processors typically contain multiple functional units that perform computations concurrently to increase the execution speed of a program. In order to make effective use of these multiple functional units, some processors allow program instructions to be executed out-of-order. Out-of-order execution eliminates the need to wait for all preceding instructions to complete before a executing a given instruction. This leads to better utilization of the multiple functional units, and hence increases computational performance.

One of the challenges in supporting out-of-order execution is to ensure that a given instruction executes only after all preceding instructions upon which the given instruction depends complete. For example, an instruction that adds two registers R1 and R2 must wait for preceding instructions to write values to registers R1 and R2 before adding the registers.

Processors that support out-of-order execution often use an "instruction scoreboard" to keep track of information regarding dependencies between instructions. These processors use this dependency information to determine the order in which instructions issue. In general, a larger scoreboard can keep track of more dependencies, which typically increases the number of instructions that are ready to issue in a given cycle. This leads to better utilization of the multiple functional units and thereby improves computer system performance.

Unfortunately, as an instruction scoreboard increases in size, the access time into the structure implementing the scoreboard also increases. This can reduce system clock speed and can thereby offset the advantages of using a larger scoreboard.

Fortunately, dependencies for faster operations, such as integer and logical instructions, tend to exhibit a high-degree of locality, which means that an instruction scoreboard only needs to keep track of a smaller number of recent preceding instructions in order to efficiently schedule these faster operations. Conversely, dependencies for slower operations, such as floating point operations, tend to exhibit less locality, which means an instruction scoreboard must keep track of a larger number of preceding instructions in order to efficiently schedule these slower operations.

What is needed is an instruction scoreboard that supports high-speed access to dependencies within a smaller number of recent preceding instructions, and supports slower-speed access to dependencies within a larger number of less recent preceding instructions.

SUMMARY

One embodiment of the present invention provides a system that selects instructions to be executed in a computer system that supports out-of-order execution of program instructions. The system receives dependency information for a first instruction. This dependency information identifies preceding instructions in the execution stream of a program that need to complete before the first instruction can be executed. The system divides this dependency information into a recent set and a less recent set. The recent set includes dependency information for a block of instructions immediately preceding the first instruction that need to complete before the first instruction can be executed. The less recent set includes dependency information for instructions not in the block of instructions immediately preceding the first instruction that need to complete before the first instruction can be executed.

The system stores the recent set of dependency information in a first store, and stores the less recent set of dependency information in a second store. The first store is smaller and faster than the second store so that an update to dependency information takes less time to propagate through the first store than the second store.

In one embodiment of the present invention, the system receives the dependency information for the first instruction from the first store and the second store, and determines from the dependency information if the first instruction is available to be executed by determining whether all preceding dependencies related to the first instruction have been satisfied.

In one embodiment of the present invention, the system selects a second instruction from instructions that are available to be executed, and executes the second instruction. In a variation on this embodiment, after the second instruction has been executed, the system updates dependency for all dependencies related to the second instruction to indicate that the second instruction has been executed. At a later point in time, the system eventually removes dependency information for the second instruction from the first store and the second store.

In one embodiment of the present invention, the system receives the dependency information from an instruction renaming unit that renames registers for instructions in order to facilitate out-of-order execution. In a variation on this embodiment, the instruction renaming unit receives the first instruction from an instruction fetch unit.

In one embodiment of the present invention, the system divides the dependency information using multiplexers to select the recent set of dependency information.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
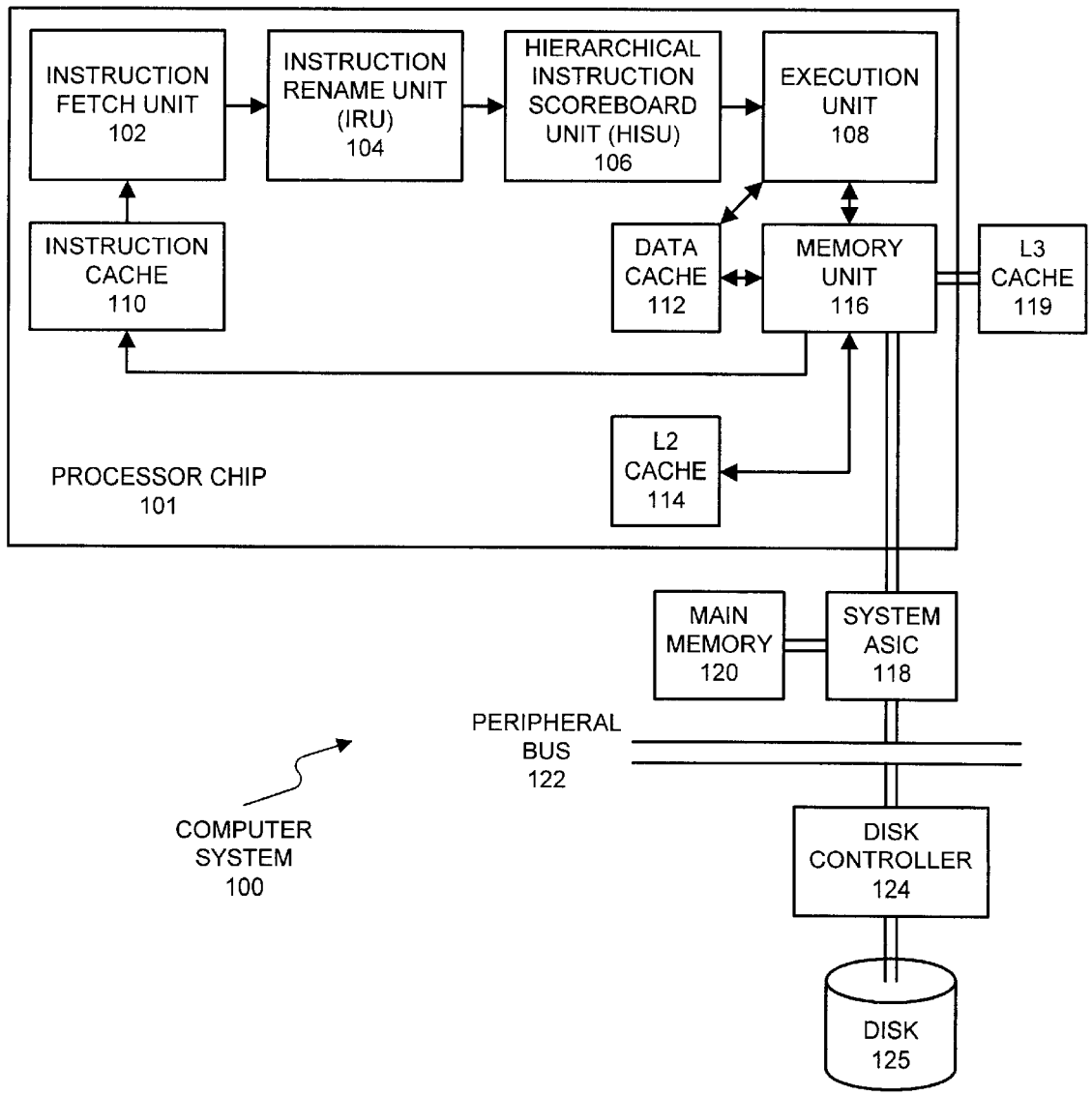
FIG. 1 illustrates a computer system in accordance with an embodiment of the present invention.

FIG. 1 illustrates computer system 100 in accordance with an embodiment of the present invention. Computer system 100 includes processor chip 101. Processor chip 101 is coupled to level-three (L3) cache 119 and system application specific integrated circuit (system ASIC) 118. System ASIC 118 includes circuitry that couples processor chip 101 to main memory 120 and peripheral bus 122. L3 cache 119 can include any type of cache memory that sits in the memory hierarchy between level-two cache (L2 cache) 114 and main memory 120.

Peripheral bus 122 can include any communication channel for coupling computer system 100 to peripheral devices. In the embodiment illustrated in FIG. 1, peripheral bus 122 is coupled to disk controller 124. Disk controller 124 can include any circuitry for controlling the operation of a storage device, such as a disk drive 125.

Within processor chip 101, computer system 100 includes memory unit 116, L2 cache 114, data cache 112, instruction cache 110, instruction fetch unit 102, instruction rename unit 104, hierarchical instruction scoreboard unit (HISU) 106 and execution unit 108.

Memory unit 116 includes circuitry that coordinates accesses to different levels of the memory hierarchy, including accesses to instruction cache 110, data cache 112, L2 cache 114, L3 cache 119 and main memory 120. L2 cache 114 is a cache memory that sits between L3 cache 119 and level-one (L1) caches (instruction cache 110 and data cache 112) in the memory hierarchy.

Data cache 112 contains data that is operated on by computer system 100. Instruction cache 110 contains instructions that perform operations using values from data cache 112. Instructions retrieved from instruction cache 110 feed through instruction fetch unit 102, which contains circuitry that controls the fetching of instructions from L2 cache 114.

Instructions retrieved by instruction fetch unit 102 feed through instruction renaming unit (IRU) 104. IRU 104 includes circuitry that performs a number of different tasks. It renames registers to facilitate out-of-order execution. It also generates a bit vector for each instruction that specifies which preceding instructions must complete before the instruction can execute.

This bit vector feeds into hierarchical instruction scoreboard unit (HISU) 106. HISU 106 keeps track of dependencies for "in-flight" instructions. (In-flight instructions are generally instructions that have been fetched but not executed.) For a given in-flight instruction, HISU 106 determines if all preceding instructions upon which the given instruction depends have executed. If so, the given instruction is ready to execute.

Next, HISU 106 selects an instruction to be executed from a set of instructions that are ready to be executed. After the instruction is selected, HISU 106 updates dependency information for instructions that depend on the selected instruction to indicate that the selected instruction has been executed.

Instructions selected by HISU 106 feed into execution unit 108. Execution unit 108 includes registers and other circuitry (such as arithmetic logic circuitry) to perform computations involving data from data cache 112.

Hierarchical Instruction Scoreboard Unit

Figure 2:
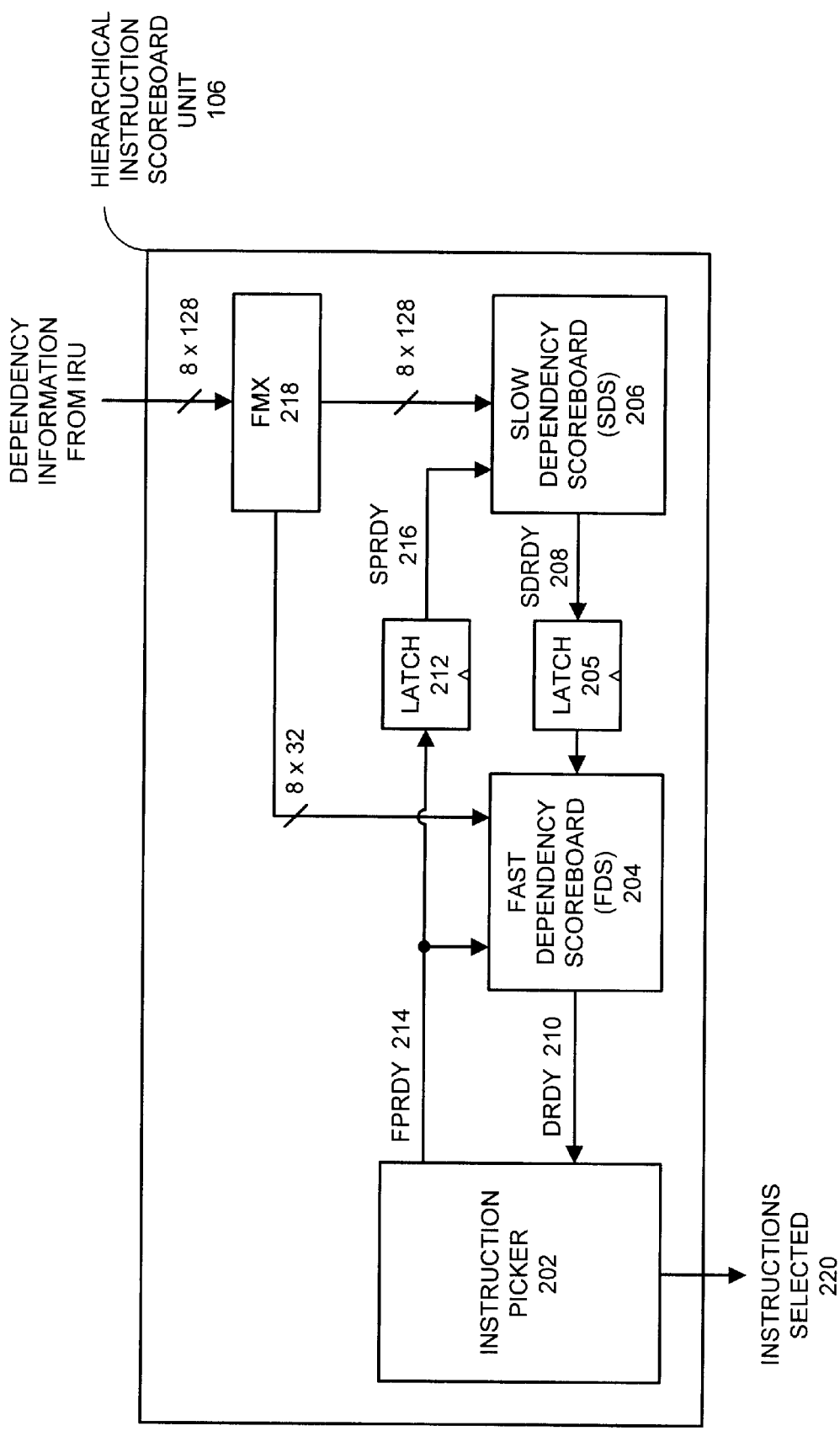
FIG. 2 illustrates the internal structure of a hierarchical instruction scoreboard unit in accordance with an embodiment of the present invention.

FIG. 2 illustrates the internal structure of hierarchical instruction scoreboard unit (HISU) 106 in accordance with an embodiment of the present invention. HISU 106 includes a number of circuits, including instruction picker 202, fast dependency scoreboard (FDS) 204, slow dependency scoreboard (SDS) 206 and fast dependency scoreboard multiplexer (FMX) 218.

FMX 218 includes circuitry that receives dependency information from IRU 104 and divides the dependency information into a more recent set and a less recent set. The more recent set is stored in FDS 204 and the less recent set is stored in SDS 206.

For example, in one embodiment of the present invention, for a given instruction, IRU 104 provides a 128-bit vector indicating which of the preceding 128 instructions in the program's instruction stream that the given instruction depends upon. FMX 218 identifies 32 bits within this vector corresponding to a block of 32 instructions immediately preceding the given instruction in the program's instruction stream. These 32 bits are sent over an 8-bit-wide bus (8×32) and stored in FDS 204. Bits corresponding to the remaining 96 preceding instruction, which are not in the immediately preceding block of 32 instructions, are stored in SDS 206. Note that for ease of implementation SDS 206 may actually receive all 128 bits over an 8-bit-wide bus (8×128) and store them with the 32 bits sent to FDS 204 being statically annulled.

HISU 106 numbers instructions in the execution stream from 0 to 127 in a repeating cycle. For example, for instruction 10, HISU 106 receives a bit vector 0–127 from IRU 104. This bit vector is split into bits for the most recent 32 instructions 0–9 and 106–127 (which are stored in FDS 204), and bits for the remaining preceding 96 instructions 10–105 (which are stored in SDS 206). Hence, FDS 204 contains 32 bits of dependency information for 128 in-flight instructions, and SDS 206 contains 96 bits of dependency information for the 128 in-flight instructions.

Each entry in SDS 206 generates slow data ready (SDRDY) signal 208, which is asserted if all dependencies within SDS 206 for the entry are clear. This indicates that no dependencies remain for the entry within SDS 206. SDRDY signal 208 feeds into FDS 204. FDS 204 generates a data ready (DRDY) signal 210 for each entry, which is asserted if SDRDY signal 208 is asserted and no dependencies remain for the entry within FDS 204. Note that SDRDY signal 208 is stored in latch 205 before entering FDS 204 to ensure proper synchronization with respect to clock phases. In one embodiment of the present invention, SDRDY signal 208 for a given entry is created by a signal line that is pulled down to ground if any of bits for the given entry are asserted.

DRDY signal 210 for each entry in HISU 106 feeds into instruction picker 202, which picks the next instruction to execute for each functional unit in computer system 100. In one embodiment of the present invention, instruction picker 202 picks six instructions at a time; one for each of six independent functional units within execution unit 108. Instruction picker 202 only selects instructions with no remaining dependencies to be executed. This selection is also biased to ensure that older instructions (in terms of program order) are generally selected before newer instructions.

After an instruction has been selected, instruction picker 202 clears the column corresponding to the instruction in FDS 204 and SDS 206. This clearing is accomplished be generating fast producer ready (FPRDY) signal 214, which feeds into FDS 204, and slow producer ready (SPRDY) signal 216, which feeds into SDS 206. Note that FPRDY signal 214 feeds through latch 212 (for clock phasing purposes) to form SPRDY signal 216.

If the column clearing process clears the last remaining dependency for a given instruction, the DRDY signal 210 for the given instruction will eventually be asserted, which may cause the given instruction to be selected. Note that the time it takes for FPRDY signal 214 to propagate through FDS 204 is much shorter than the time it takes for SPRDY signal 216 to propagate through SDS 206. This generally results in a faster scoreboard lookup for simple arithmetic operations that typically depend on the 32 most recently fetched instructions.

In one embodiment of the present invention, FDS 204 and SDS 206 also include a retirement mechanism that retires instructions from FDS 204 and SDS 206 after they have completed. This retirement mechanism includes a separate retirement port within FDS 204 and SDS 206 as well as a retirement pointer.

Organization of Fast Dependency Scoreboard

Figure 3:
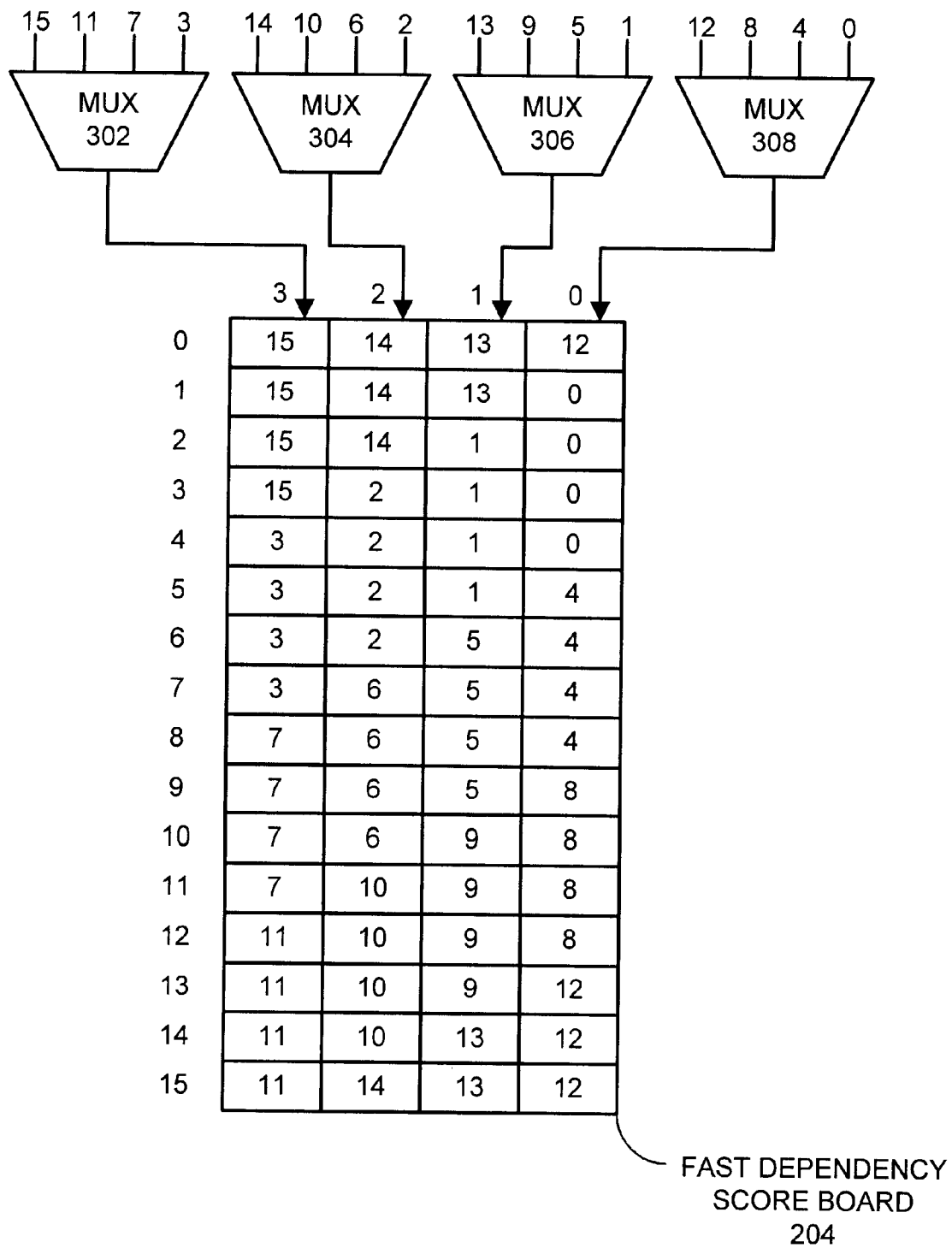
FIG. 3 illustrates how dependencies are stored within the fast dependency scoreboard in accordance with an embodiment of the present invention.

FIG. 3 illustrates how dependencies are stored within the fast dependency scoreboard in accordance with an embodiment of the present invention. FIG. 3 illustrates a scaled down version of FDS 204, which contains the dependency information for the preceding four instructions for each of 16 in flight instructions. (Note that the dimensions of FDS 204 will generally be larger. For example, in one embodiment of the present invention, FDS 204 stores dependency information for 32 preceding instructions for each of 128 in flight instructions.) Note that each row contains dependency information for the preceding four instructions. For example, row two contains dependency information for the preceding four instructions 1, 0, 15 and 14 in cyclic order.

Also note that each column in FDS 204 is arranged so that one of four instructions can be written to each column. For example, multiplexer (MUX) 302, which is part of FMX 218, selects dependency information for column 3 from one of bits 15, 11, 7, and 3. Similarly, MUX 304 selects dependency information for column 2 from one of bits 14, 10, 6, and 2; MUX 306 selects dependency information for column 1 from one of bits 13, 9, 5, and 1; and MUX 308 selects dependency information for column 0 from one of bits 12 8, 4, and 0.

Timing Within Hierarchical Instruction Scoreboard Unit

Figure 4:
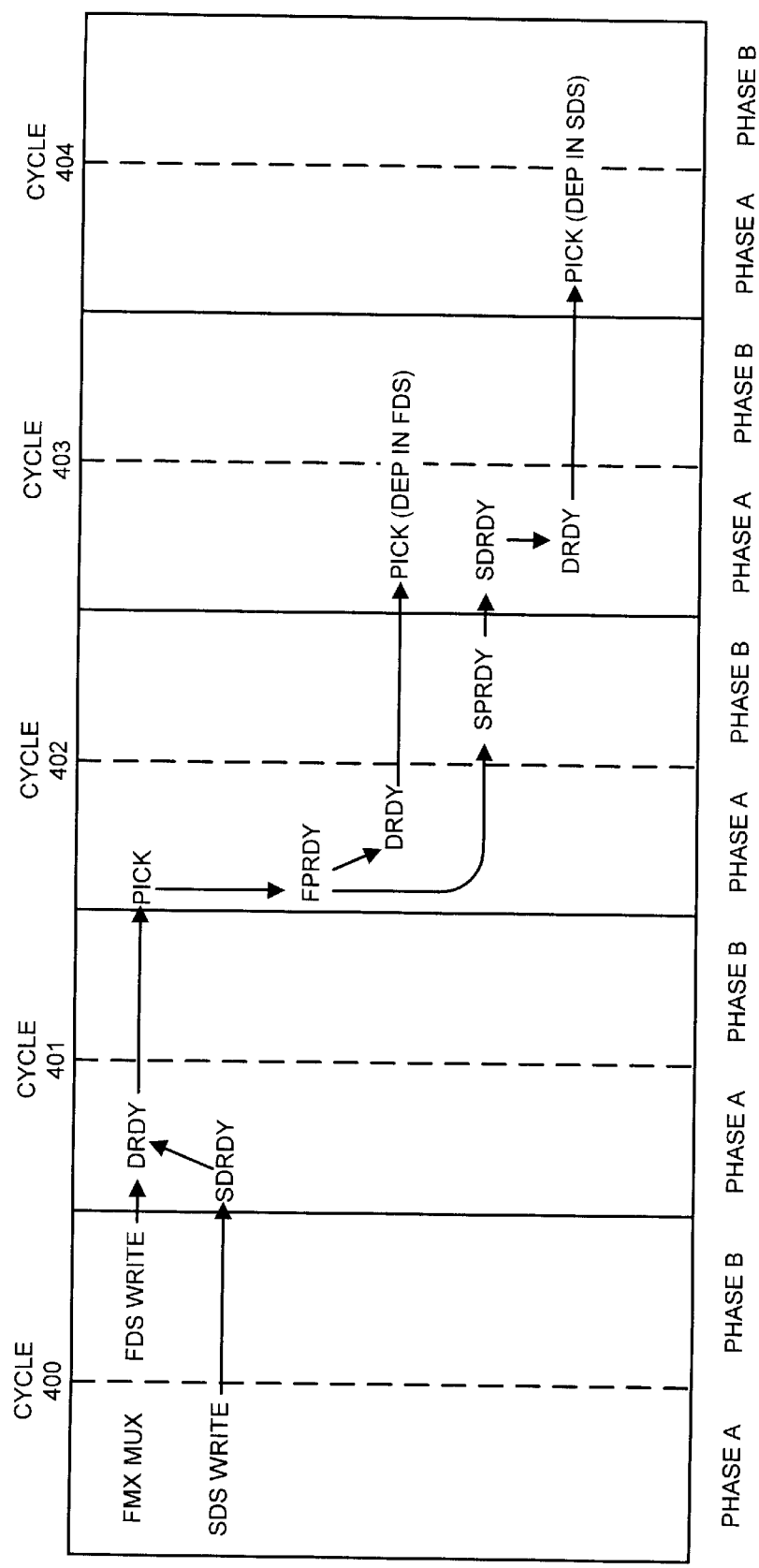
FIG. 4 illustrates timing within the hierarchical instruction scoreboard unit in accordance with an embodiment of the present invention.

FIG. 4 illustrates timing within hierarchical instruction scoreboard unit (HISU) 106 in accordance with an embodiment of the present invention. FIG. 4 illustrates five cycles, 400–404, that are each divided into two phases, A and B. At the start of cycle 400, dependency information for a given instruction is received from IRU 104. A portion of this dependency information immediately passes through FMX 218 and is written into SDS 206. This dependency information also passes through FMX 218, which selects the most recent 32 bits of dependency information for each instruction. This "recent set" of dependency information is written into FDS 204. Note that this selection process consumes phase A of cycle 400. After the write operations to FDS 204 and SDS 206 are complete, it is possible for DRDY signal 210 for the given instruction to be asserted if the given instruction is not dependent on any uncompleted preceding instructions. This allows instruction picker 202 to pick the given instruction to be executed in phase A of cycle 402. If instruction picker 202 picks the given instruction FPRDY signal 214 is asserted for the instruction, which causes corresponding columns in FDS 204 and SDS 206 to be cleared.

The clearing of these columns may cause DRDY signal 210 for a subsequent instruction to be asserted at the end of phase A of cycle 402 if the cleared bit is located in FDS 204. This can result in a possible instruction pick of the subsequent instruction in phase A of cycle 403. Alternatively, if the cleared bit is located in SDS 206, SPRDY signal 216 is asserted in phase B of cycle 402. This causes DRDY signal 210 to be asserted in phase A of cycle 403 resulting in a possible pick of the subsequent instruction in phase A of cycle 404.

Note that the propagation time through FDS 204 is considerably shorter than the propagation time through SDS 206.

Operation of Hierarchical Instruction Scoreboard Unit

Figure 5:
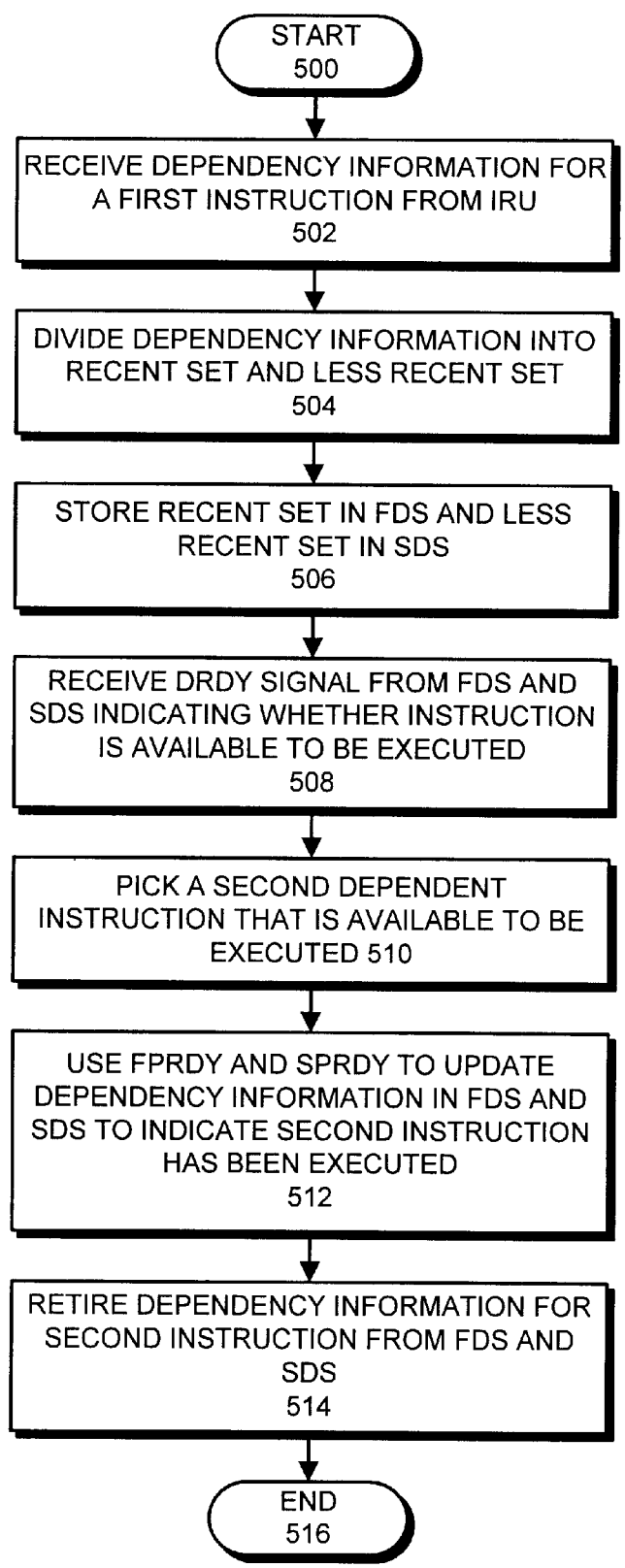
FIG. 5 is a flow chart illustrating operation of the hierarchical instruction scoreboard unit in accordance with an embodiment of the present invention.

FIG. 5 is a flow chart illustrating operation of hierarchical instruction scoreboard unit (HISU) 106 in accordance with an embodiment of the present invention.

Step 500 indicates the state in which the system is ready to receive dependency information. The system starts by receiving dependency information from IRU 104 for a first instruction (step 502). (In one embodiment of the present invention, the system receives dependency information for more than one instruction at a time.) Next, the system uses multiplexers within FMX 218 to divide the dependency information into a recent set and a less recent set (step 504). The recent set is stored in FDS 204, and the less recent set is stored in SDS 206 (step 506).

Next, for each instruction stored in HISU 106, the system receives DRDY signal 210 at instruction picker 202 (step 508). DRDY signal 210 indicates whether the instruction is free of dependencies upon preceding instructions, and is hence ready to execute.

Next, the system uses instruction picker 202 to select a second instruction to be executed from the instructions for which DRDY signal 210 is asserted (step 510). (Note that the system can sometimes select the first instruction as the second instruction second.) In one embodiment of the present invention, instruction picker 202 selects the oldest unretired instruction that is ready to execute.

Next, while the second instruction is being executed, the system uses FPRDY signal 214 and SPRDY signal 216 to update dependency information within FDS 204 and SDS 206 to indicate that the second instruction has been executed (step 512).

At some time in the future, the system retires dependency information for the second instruction from HISU 106 (step 514). Then the system enters the end state and is ready to receive the next dependency information (step 516).

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for dividing, storing, and updating instruction dependency information, and selecting instructions to be executed in a computer system that supports out-of-order execution of program instructions, comprising:
   receiving dependency information for a first instruction, the dependency information identifying preceding instructions in an execution stream of a program that need to complete before the first instruction can be executed;
   dividing the dependency information into a first set and a second set, wherein:
      the first set identifies the first instruction's dependencies on a block of instructions immediately preceding the first instruction that need to complete before the first instruction can be executed, and
      the second set identifies the first instruction's dependencies on instructions that are not in the block of instructions immediately preceding the first instruction that need to complete before the first instruction can be executed;
      whereby dependency information for the first instruction is divided between the first set and the second set;
   storing the first set of dependency information in a first store; and
   storing the second set of dependency information in a second store;
   wherein the first store is smaller and faster than the second store so that an update to dependency information takes less time to propagate through the first store than the second store.

2. The method of claim 1, further comprising:
   receiving the dependency information for the first instruction from the first store and the second store; and
   determining from the dependency information if the first instruction is available to be executed by determining whether all preceding dependencies related to the first instruction have been satisfied.

3. The method of claim 2, further comprising:
   selecting a second instruction from instructions that are available to be executed; and
   executing the second instruction.

4. The method of claim 3, further comprising after the second instruction has been executed, updating dependency information for all dependencies related to the second instruction to indicate that the second instruction has been executed.

5. The method of claim 3, further comprising after the second instruction has been executed removing dependency information for the second instruction from the first store and the second store.

6. The method of claim 1, wherein receiving the dependency information includes receiving the dependency information from an instruction renaming unit that renames registers for instructions in order to facilitate out-of-order execution.

7. The method of claim 6, wherein the instruction renaming unit receives the first instruction from an instruction fetch unit.

8. An apparatus that divides, stores, and updates instruction dependency information, and selects instructions to be executed in a computer system that supports out-of-order execution of program instructions, comprising:
   an input that is configured to receive dependency information for a first instruction, the dependency information identifying preceding instructions in an execution stream of a program that need to complete before the first instruction can be executed;
   routing circuitry that is configured to divide the dependency information into a first set and a second set, wherein:
      the first set identifies the first instruction's dependencies on a block of instructions immediately preceding the first instruction that need to complete before the first instruction can be executed, and
      the second set identifies the first instruction's dependencies on instructions that are not in the block of instructions immediately preceding the first instruction that need to complete before the first instruction can be executed;
   whereby dependency information for the first instruction is divided between the first set and the second set;
   a first store for storing the first set of dependency information; and
   a second store for storing the second set of dependency information;
   wherein the first store is smaller and faster than the second store so that an update to dependency information takes less time to propagate through the first store than the second store.

9. The apparatus of claim 8, further comprising determination circuitry that is configured to,
   receive the dependency information for the first instruction from the first store and the second store, and to
   determine from the dependency information if the first instruction is available to be executed by determining whether all preceding dependencies related to the first instruction have been satisfied.

10. The apparatus of claim 9, further comprising:
    selection circuitry that selects a second instruction from instructions that are available to be executed; and
    execution circuitry that executes the second instruction.

11. The apparatus of claim 10, further comprising updating circuitry, which is configured to update dependency information for all dependencies related to the second instruction to indicate that the second instruction has been executed.

12. The apparatus of claim 10, further comprising removing circuitry that is configured to remove dependency information for the second instruction from the first store and the second store after the second instruction has been executed.

13. The apparatus of claim 8, further comprising an instruction renaming unit that is configured to,
    rename registers for instructions in order to facilitate out-of-order execution, and to
    generate dependency information for instructions.

14. The apparatus of claim 13, further comprising an instruction fetch unit that is configured to retrieve instructions from memory, and to send the instructions to the instruction renaming unit.

15. The apparatus of claim 8, wherein the routing circuitry includes multiplexers that select the first set of the dependency information.

16. A computer system that supports out-of-order execution of program instructions, comprising:

a processor;

a memory;

a dependency scoreboard within the processor;

an input within the dependency scoreboard that is configured to receive dependency information for a first instruction, the dependency information identifying preceding instructions in an execution stream of a program that need to complete before the first instruction can be executed;

routing circuitry within the dependency scoreboard that is configured to divide the dependency information into a first set and a second set, wherein:

the first set identifies the first instruction's dependencies on a block of instructions immediately preceding the first instruction that need to complete before the first instruction can be executed, and the second set identifies the first instruction's dependencies on instructions that are not in the block of instructions immediately preceding the first instruction that need to complete before the first instruction can be executed;

whereby dependency information for the first instruction is divided between the first set and the second set;

a first store within the dependency scoreboard for storing the first set of dependency information; and a second store within the dependency scoreboard for storing the second set of dependency information;

wherein the first store is smaller and faster than the second store so that an update to dependency information takes less time to propagate through the first store than the second store.

17. The computer system of claim 16, further comprising determination circuitry within the dependency scoreboard that is configured to, receive the dependency information for the first instruction from the first store and the second store, and to determine from the dependency information if the first instruction is available to be executed by determining whether all preceding dependencies related to the first instruction have been satisfied.

18. The computer system of claim 17, further comprising:

selection circuitry within the dependency scoreboard that is configured to select a second instruction from instructions that are available to be executed; and execution circuitry that executes the second instruction.

19. The computer system of claim 18, further comprising updating circuitry within the dependency scoreboard, which is configured to update dependency information for all dependencies related to the second instruction to indicate that the second instruction has been executed.

20. The computer system of claim 18, further comprising removing circuitry within the dependency scoreboard that is configured to remove dependency information for the second instruction from the first store and the second store after the second instruction has been executed.

* * * * *